United States Patent
Kinpara et al.

(10) Patent No.: US 7,042,193 B2
(45) Date of Patent: May 9, 2006

(54) CONTROL APPARATUS FOR ROTATING MACHINE

(75) Inventors: Yoshihiko Kinpara, Tokyo (JP); Shinichi Furutani, Tokyo (JP); Toshiyuki Kaitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/525,066

(22) PCT Filed: Aug. 28, 2003

(86) PCT No.: PCT/JP03/10936

§ 371 (c)(1),
(2), (4) Date: Feb. 18, 2005

(87) PCT Pub. No.: WO2005/025049

PCT Pub. Date: Mar. 17, 2005

(65) Prior Publication Data

US 2005/0242766 A1    Nov. 3, 2005

(51) Int. Cl.
*H02P 23/00* (2006.01)
*H02P 25/00* (2006.01)
*H02P 27/00* (2006.01)
*H02P 27/04* (2006.01)

(52) U.S. Cl. ............... 318/807; 318/801; 318/805; 318/808; 318/812

(58) Field of Classification Search ............ None
See application file for complete search history.

(56) References Cited

U.S. PATENT DOCUMENTS

| | | | |
|---|---|---|---|
| 4,587,474 A * | 5/1986 | Espelage et al. ............ 318/709 |
| 5,247,237 A * | 9/1993 | Koyama et al. ............ 318/808 |
| 5,500,581 A | 3/1996 | Hatanaka et al. | |
| 5,723,968 A | 3/1998 | Sakurai | |
| 5,786,231 A | 7/1998 | Warren et al. | |
| 5,796,237 A | 8/1998 | Yamakawa | |
| 5,828,199 A * | 10/1998 | Tajima et al. ............ 318/779 |
| 5,880,572 A * | 3/1999 | Tajima et al. ............ 318/800 |
| 6,194,864 B1 | 2/2001 | Kinpara et al. | |
| 6,335,605 B1 * | 1/2002 | Negoro ............ 318/727 |
| 6,396,229 B1 * | 5/2002 | Sakamoto et al. ......... 318/439 |
| 6,605,912 B1 * | 8/2003 | Bharadwaj et al. ........ 318/439 |
| 2004/0100222 A1 * | 5/2004 | Karikomi ............ 318/801 |

FOREIGN PATENT DOCUMENTS

| | | |
|---|---|---|
| JP | 06-225574 | 8/1994 |
| JP | 11-150996 | 6/1999 |
| JP | 2001-037248 | 2/2001 |

* cited by examiner (Continued)

*Primary Examiner*—Marlon T. Fletcher
*Assistant Examiner*—Renata McCloud
(74) *Attorney, Agent, or Firm*—Leydig, Voit & Mayer, Ltd.

(57) ABSTRACT

In a control apparatus for a rotating machine, an integration unit integrates a primary angular frequency based on an angular velocity command and computes phase, a power converting unit applies three-phase voltages to the rotating machine according to three-phase voltage commands, a current detecting unit detects three-phase currents flowing through to the rotating machine, a coordinate converting unit converts the currents detected by the current detecting unit into currents on rotating two-axis coordinates based on the phase output by the integration unit and converts voltage commands on the rotating two-axis coordinates into the three-phase voltage commands, and a voltage command computing unit computes the voltage commands based on the absolute value of deviations of the primary angular frequency and the current components along each of the rotating two-axis coordinates.

3 Claims, 7 Drawing Sheets

CONTROL APPARATUS FOR ROTATING MACHINE

TECHNICAL FIELD

The present invention relates to a control apparatus for a rotating machine.

BACKGROUND ART

Examples of a rotating machine include an induction machine and a synchronous machine. As a control apparatus for the induction motor, a control apparatus disclosed in, for example, Patent Literature 1 is conventionally known. Namely, as particularly shown in pages 8 to 12, FIGS. 1, 8, 9, 12, and 14, the Patent Literature 1 discloses the control apparatus for the induction motor, including a power conversion circuit that outputs an alternating-current primary voltage of a variable voltage at a variable frequency to drive the induction motor, a current detector that detects a primary current supplied from the power conversion circuit to the induction motor, a current component computing circuit that computes first and second current components from the primary current and a preset frequency command for the alternating-current primary voltage, a magnetic flux command computing circuit that computes a magnetic flux command so that an amplitude ratio of a square of the first current component to a square of the second current component is a preset predetermined value, a voltage component command computing circuit that computes a primary voltage component command from the frequency command and the magnetic flux command, and a primary voltage command computing circuit that computes a primary voltage command of the induction motor from the frequency command and the primary voltage component command, and that outputs the computed primary voltage command to the power conversion circuit.

The control apparatus for the induction motor disclosed in the Patent Literature 1 controls the current component computing circuit to compute the first current component in phase with the primary voltage component command, and the second current component shifted in phase by 90 degrees from the primary voltage component command. Therefore, the amplitude ratio of the square of the first current component to that of the second current component is equal to the preset predetermined value, and the induction motor can be thereby driven with high efficiency.

Patent Literature 2 discloses a technique for computing a slip and a slip frequency with optimum efficiency from a frequency, a voltage, and a current of an inverter, and for controlling the slip and the slip frequency with the optimum frequency to coincide with each other. Patent Literature 3 also discloses a technique for computing a slip and a slip frequency with optimum efficiency from a frequency, a voltage, and a current of an inverter, and for controlling the slip and the slip frequency with the optimum frequency to coincide with each other.

[Patent Literature 1] Japanese Patent Application Laid-Open No. 2000-175492
[Patent Literature 2] U.S. Pat. No. 5,500,581 Specification
[Patent Literature 3] U.S. Pat. No. 5,786,231 Specification However, the conventional techniques have the following problems. The squares of the first and the second current components are applied as the power component in phase with the primary voltage component command and the second power component shifted in phase from the primary voltage component command, respectively. In addition, the current component computing circuit is controlled so that the amplitude ratio of the square of the first current component to that of the second current component is equal to the preset predetermined value. As a result, there are a problem that a current transient response when a load torque increases differs from that when the load decreases even if the load torques in both cases are at an equal operating point, and a problem that a current transient response at a light load point differs from that at a heavy load point.

If a rotation speed is rapidly changed by an impact load or the like, the slip frequency given by "(the primary angular frequency)−(rotation speed)" is also rapidly changed so as to keep a primary angular frequency constant. As a result, a current amplitude is rapidly changed, which may possibly cause overcurrent.

The Patent Literature 2 does not consider the transient property of the induction motor.

The present invention has been achieved in order to solve the conventional problems. It is an object of the present invention to provide a control apparatus for a rotating machine that can keep a current transient response constant irrespective of a change in a load torque or an operating point, and set a current amplitude within a desired range even if a rotation speed is rapidly changed by an impact load or the like.

DISCLOSURE OF THE INVENTION

The present invention includes an integration unit that integrates a primary angular frequency applied based on an angular velocity command, and that computes a phase; a power converting unit that applies three phase voltages to the rotating machine according to three phase voltage commands; a current detecting unit that detects two phase currents among three phase currents carried to the rotating machine; a coordinate converting unit that conducts a coordinate conversion of converting the two phase currents into currents on a rotation two-axis coordinate based on the phase output from the integration unit, and of converting voltage commands on the rotation two-axis coordinates into the three phase voltage commands; and a voltage command computing unit that computes the voltage commands on the rotation two-axis coordinate based on the primary angular frequency and absolute values of respective axis current components on the rotation two-axis coordinate.

According to the present invention, the respective axis current components on the rotation two-axis coordinate are dealt with as the absolute values. Therefore, a current transient response when a load torque increases can be made coincident with a current transient response when the load torque decreases as long as the load torque is at an equal operating point.

In the above invention, the voltage command computing unit computes an excitation current command that is changed depending on a load, obtains a minor excitation current command by dividing the absolute values of the respective axis current components on the rotation two-axis coordinate by the excitation current command, and computes the voltage commands on the rotation two-axis coordinate based on the minor excitation current command obtained and the primary angular frequency.

According to the present invention, the absolute values of the respective axis current components on the rotation two-axis coordinate are divided by the excitation current command that is changed according to the load. Therefore, even if the operating point of the load torque changes from the light load point to the heavy load point, the current transient response can be kept constant.

The above invention further includes a frequency correcting unit that computes a frequency correction amount based on the current on the rotation two-axis coordinate, and that subtracts the frequency correction amount from the primary angular frequency applied based on the angular velocity command, and that outputs the primary angular frequency from which the frequency correction amount is subtracted.

According to the present invention, even if the rotation speed is rapidly changed by an impact load or the like, the primary angular frequency is changed according to the change in the rotation speed. Therefore, the rapid change in the current amplitude can be suppressed, and the problem that the overcurrent may possibly occur can be solved.

BEST MODE FOR CARRYING OUT THE INVENTION

Exemplary embodiments of a control apparatus for a rotating machine according to the present invention will be explained in detail with reference to the accompanying drawings.

Figure 1:
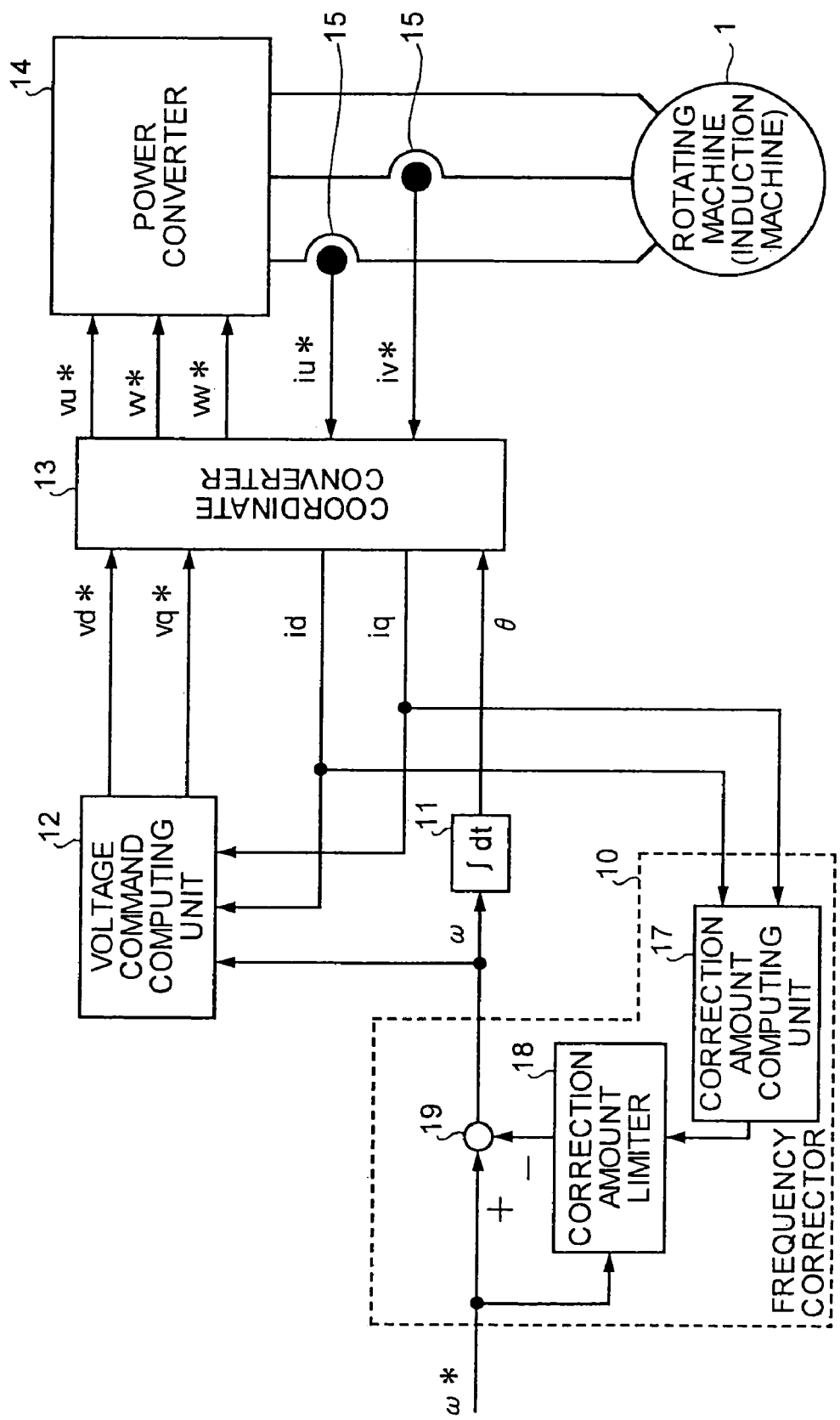
FIG. 1 is a block diagram of a configuration of a control apparatus for a rotating machine according to one embodiment of the present invention.

FIG. 1 is a block diagram of a configuration of a control apparatus for a rotating machine according to one embodiment of the present invention. As shown in FIG. 1, a control apparatus of a rotating machine (e.g., an induction motor) 1 according to this embodiment includes a frequency corrector 10, an integrator 11, a voltage command computing unit 12, a coordinate converter 13, a power converter 14, and a current detector 15.

The power converter 14 applies three phase voltages to the rotating machine 1 based on three phase voltage commands vu*, vv*, and vw* input from the coordinate converter 13.

The current detector 15 detects two phase currents iu and iv among three phase currents carried to the rotating machine 1, and outputs the detected phase currents iu and iv to the coordinate converter 13. In this embodiment, the current detector 15 constituted so as to detect the two phase currents among the three phase currents carried to the rotating machine 1 is shown. Alternatively, the current detector 15 may detect, for example, all the three phase currents or may detect a bus current of the power converter 14 and detect the three phase currents carried to the rotating machine 1 based on the detected bus current.

The integrator 11 integrates a primary angular frequency ω of the rotating machine 1 input from the frequency corrector 10 to calculate a phase θ, and outputs the phase θ to the coordinate converter 13.

The coordinate converter 13 converts the two phase currents iu and iv obtained from the current detector 15 into currents id and iq on a rotation two-axis coordinate based on the phase θ output from the integrator 11, and applies the currents id and iq to the voltage command computing unit 12 and the frequency corrector 10. In addition, the coordinate converter 13 conducts a coordinate conversion of converting the voltage commands vd* and vq* on the rotation two axes input from the voltage command computing unit 12 into the three phase voltage commands vu*, vv*, and vw*.

The voltage command computing unit 12 computes the voltage commands vd* and vq* on the rotation two-axis coordinate based on the primary angular frequency ω of the rotating machine 1 input from the frequency corrector 10 and the currents id and iq on the rotation two-axis coordinates input from the coordinate converter 13.

The frequency corrector 10 corrects an angular velocity command ω* input from an outside based on the currents id and iq on the rotation two-axis coordinate input from the coordinate converter 13, and outputs the primary angular frequency ω. Specifically, the frequency corrector 10 is composed of a correction amount computing unit 17 that computes a frequency correction amount Δω according to a change amount of a load of the rotating machine 1 based on the currents id and iq on the rotation two-axis coordinate, a correction amount limiter 18 that limits the frequency correction amount Δω according to an angular velocity command ω*, and a subtracter 19 that subtracts a limit value set by the correction amount limiter 18 from the angular velocity command ω*, and that outputs the primary angular frequency ω.

As for the currents id and iq on the rotation two-axis coordinate output from the coordinate converter 13, it is assumed herein that the current id is a current component in phase with the phase θ, and that the current iq is a current component at a phase orthogonal to the phase θ. In addition, for the voltage commands vd* and vq* on the rotation two-axis coordinate input to the coordinate converter 5, it is assumed herein that the voltage command vd* is a voltage command component in phase with the phase θ, and that the voltage command vq* is a voltage command component at a phase orthogonal to the phase θ.

With reference to FIG. 1, an operation performed by the frequency corrector 10 will first be explained. The frequency corrector 10 is provided to solve the problem with the technique disclosed in the Patent Literature 1. Namely, the problem is that when the rotation speed is rapidly changed by the impact load or the like, the slip angular frequency (=(primary angular frequency)−(rotation speed)) is rapidly changed to keep the primary angular frequency constant. As a result, the current amplitude is rapidly changed, thereby disadvantageously causing an overcurrent.

That is, the rotation speed of the rotating machine 1 accelerates when an axial torque increases and decelerates when the axial torque decreases. If a change ratio of the axial torque can be located, a change in the rotation speed can be determined. In this embodiment, therefore, an output torque of the rotating machine 1 is used in place of the axial torque thereof, whereby the primary angular frequency is corrected according to the change in the rotation speed so as to prevent the rapid change in the slip angular frequency (=(primary angular frequency)−(rotation speed)).

The correction amount computing unit 17 computes the frequency correction amount Δω according to the change amount of the load of the rotating machine 1 as follows. A secondary magnetic flux equivalent value φd is computed from the current id as represented by Equation (1), and an output torque estimated value τ0 is computed from the current id and the obtained secondary magnetic flux equivalent value φd as represented by Equation (2).

$$\phi d = 1/(1+Tr \cdot s) \times id \quad (1)$$

$$\tau 0 = Pm \times \phi d \times iq \quad (2)$$

In the Equations (1) and (2), symbol s denotes a Laplace operator, symbol Tr denotes an electrical time constant of the rotating machine 1, and symbol Pm denotes the number of pole pairs of the rotating machine 1. The frequency correction amount Δω according to a change in the obtained output torque estimated value τ0 is computed as represented by Equation (3). In the Equation (3), symbols G1 and G2 denote arbitrary real numbers.

$$\Delta\omega = G1 \times s/(1+G2 \times s) \times \tau 0 \quad (3)$$

If the frequency correction amount Δω is too large, the primary angular frequency ω is too low. As a result, a problem that the rotating machine 1 cannot generate a sufficient output torque occurs. To avoid the problem, the correction amount limiter 18 provides an upper limit or a lower limit to the frequency correction amount Δω according to the angular velocity command ω*. By doing so, an appropriate primary angular frequency ω is output from the subtracter 19.

The frequency corrector 10 thus constituted can change the primary angular frequency ω according to the change in the rotation speed even when the rotation speed is rapidly changed by the impact load or the like. It is therefore possible to suppress the rapid change in the current amplitude and solve the problem that the overcurrent may possibly occur.

When the rotating machine 1 outputs a torque, the rotation angular frequency is equal to a value obtained by subtracting the slip angular frequency from the primary angular frequency. This slip angular frequency may be considered to be proportional to the output torque, and the Equation (3) may be replaced by the following Equation (4). In the Equation (4), symbol G3 is an arbitrary real number.

$$\Delta\omega = \{G1 \times s/(1+G2 \times s) + G3\} \times \tau 0 \quad (4)$$

If the Equation (4) is used in place of the Equation (3), not only an advantage of suppressing the rapid change in the current amplitude but also an advantage that a reduction in the speed of the rotating machine 1 resulting from the slip angular frequency can be corrected can be exhibited. It is noted, however, that if the arbitrary real number G1 is set at zero, the reduction in the speed of the rotating machine 1 resulting from the slip angular frequency can be corrected, but the advantage of suppressing the rapid change in the current amplitude is hampered.

Figure 2:
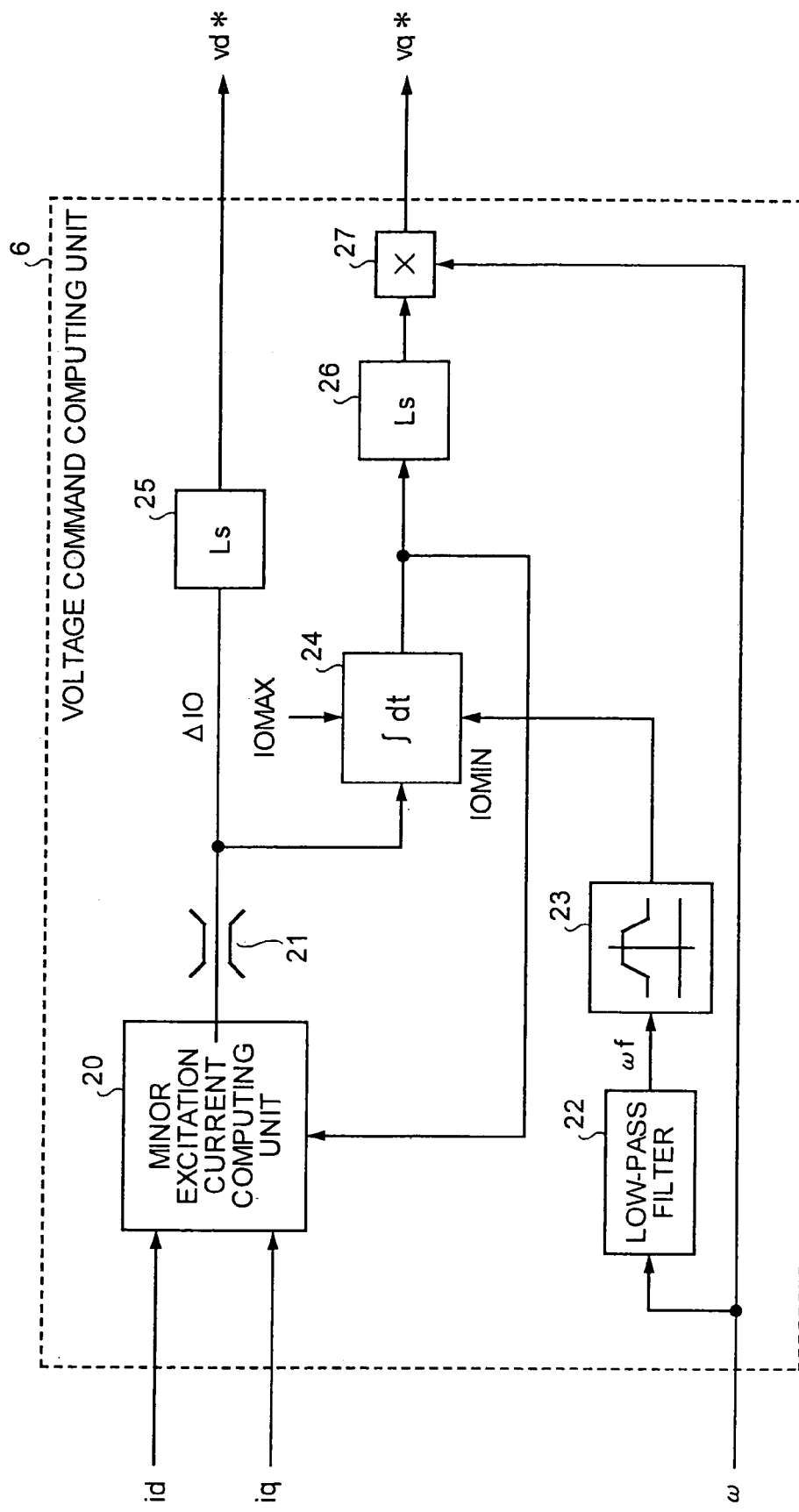
FIG. 2 is a block diagram of an example of a voltage command computing unit shown in FIG. 1.

FIG. 2 is a block diagram of a configuration example of the voltage command computing unit 12 shown in FIG. 1. As shown in FIG. 2, the voltage command computing unit 12 includes a minor excitation current computing unit 20, a limiter 21, a table 23, a control function-added integrator 24, gain units 25 and 26, and a multiplier 27.

The voltage command computing unit 12 thus constituted calculates a minor excitation current command ΔI0 based on a deviation between absolute values of the respective axial current components on the rotation two-axis coordinate and an excitation current command I0 applied to the rotating machine 1 by amplifying this minor excitation current command ΔI0. The voltage command computing unit 12 computes the voltage commands for applying voltages to the rotating machine 1 by the excitation current command ΔI0.

Figure 3:
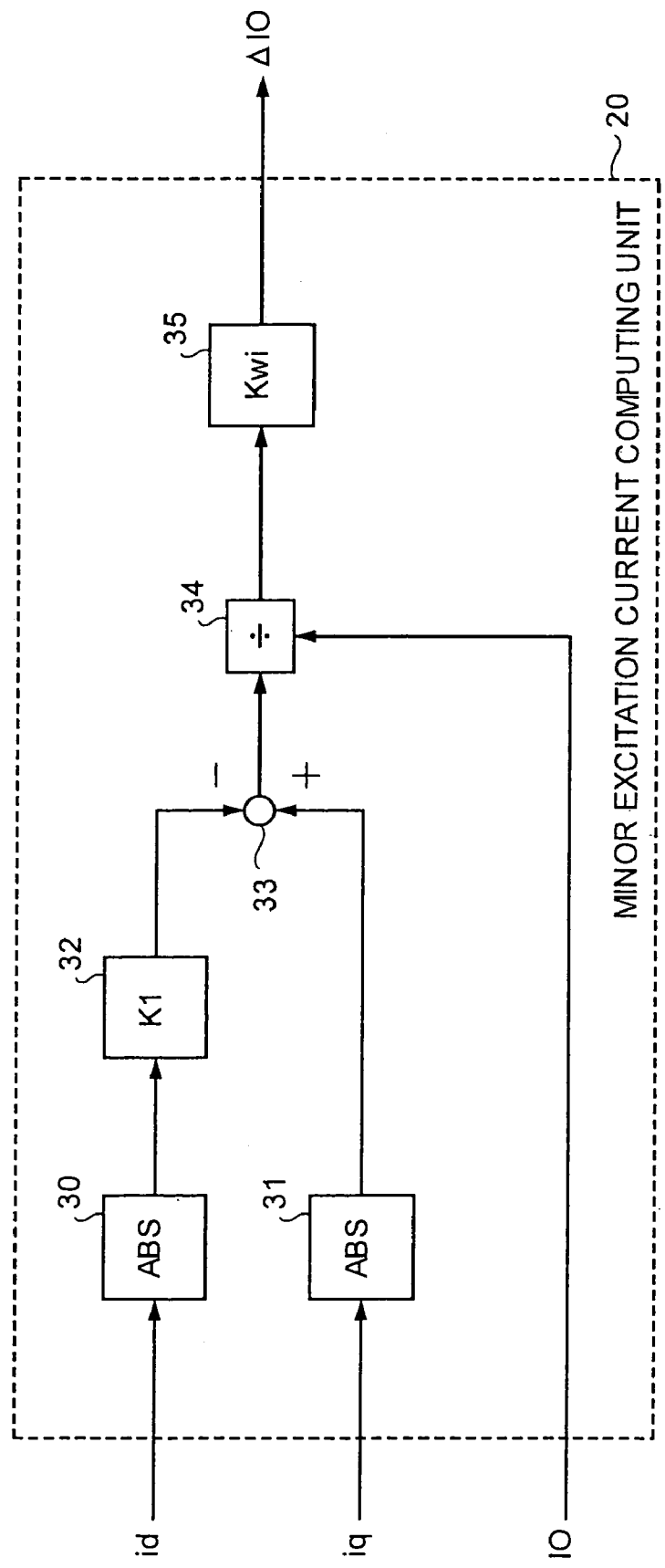
FIG. 3 is a block diagram of an example of a minor excitation current computing unit shown in FIG. 2.

The minor excitation current computing unit 20 is specifically constituted as shown in FIG. 3. The minor excitation current computing unit 20 computes an absolute value of a q-axis current component and an absolute value of a d-axis current component on the rotation two axes, and multiplies a deviation between the absolute values by Kwi, divides the multiplication result by the excitation current command I0 input from the control function-added integrator 24, and computes the minor excitation current command ΔI0.

The limiter 21 limits an amplitude of the minor excitation current command ΔI0 output from the minor excitation current computing unit 20. A low-pass filter 22 outputs a low frequency component ωf obtained by eliminating a high frequency component from the primary angular frequency ω. The table 23 outputs a lower limit I0MIN of the excitation current command based on the low frequency component ωf output from the low-pass filter 22.

The control function-added integrator 24 integrates the minor excitation current command ΔI0 obtained from the limiter 21, and outputs the excitation current command I0 in which the result of the integration is limited within a range between the lower limit I0MIN of the excitation current command input from the table 23 and a preset upper limit I0MAX of the excitation current command.

The gain unit 25 multiplies the minor excitation current command ΔI0 obtained from the limiter 21 by an inductance Ls of the rotating machine 1, and outputs the multiplication result as the d-axis voltage command vd* on the rotation two-axis coordinate. The gain unit 26 multiplies the excitation current command I0 obtained from the control function-added integrator 24 by the inductance Ls of the rotating machine 1. The multiplier 27 multiplies an output of the gain unit 26 by the primary angular frequency ω, and outputs the multiplication result as the q-axis voltage command vq* on the rotation two-axis coordinate.

FIG. 3 is a block diagram of a configuration example of the minor excitation current computing unit 20 shown in FIG. 2. As shown in FIG. 3, the minor excitation current computing unit 20 includes absolute value computing units (ABSs) 30 and 31, a gain unit 32, a subtracter 33, a divider 34, and a gain unit 35.

The absolute value computing unit (ABS) 30 computes the absolute value |id| of the d-axis current component id. The absolute value computing unit (ABS) 31 computes the absolute value |iq| of the q-axis current component iq. The gain unit 32 multiplies the absolute value |id| of the d-axis current component id output from the absolute value computing unit (ABS) 30 by K1.

The subtracter 33 subtracts K1×|id| output from the gain unit 32 from the absolute value |iq| of the d-axis current component id output from the absolute value computing unit (ABS) 31. The divider 34 divides the subtraction result of the subtracter 33 by the excitation current command I0. The gain unit 35 multiplies the division result of the divider 34 by Kwi, and outputs the multiplication result as the minor excitation current command ΔI0.

As explained above, the voltage command computing unit 12 computes the voltage commands on the rotation two-axis coordinate based on the primary angular frequency and the deviation (|iq|−K1×|id|) related to the absolute values of the respective axial current components on the rotation two axes.

Figure 4:
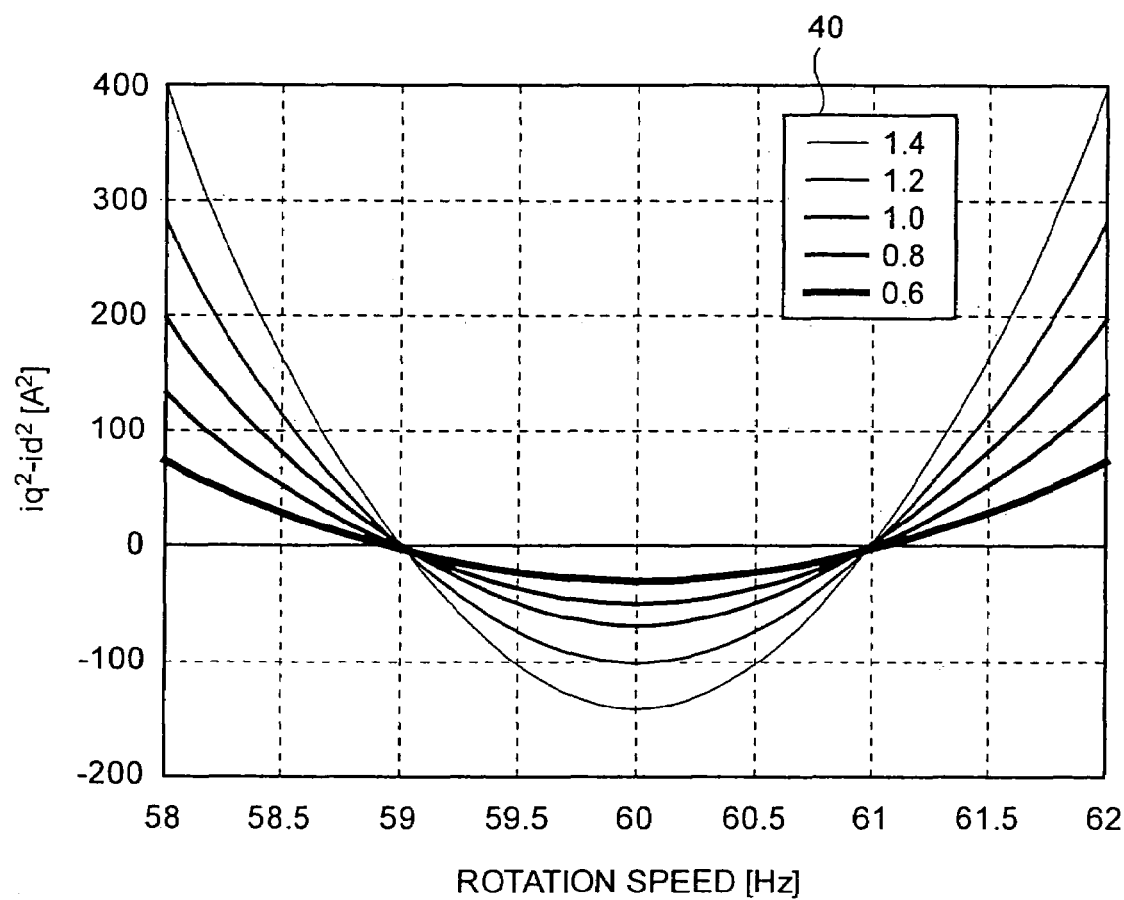
FIG. 4 is a graph explaining the relationship between rotation speed and current deviation ($iq^2-id^2$) when an excitation current command is variably changed at a primary frequency of 60 Hertz.
Figure 5:
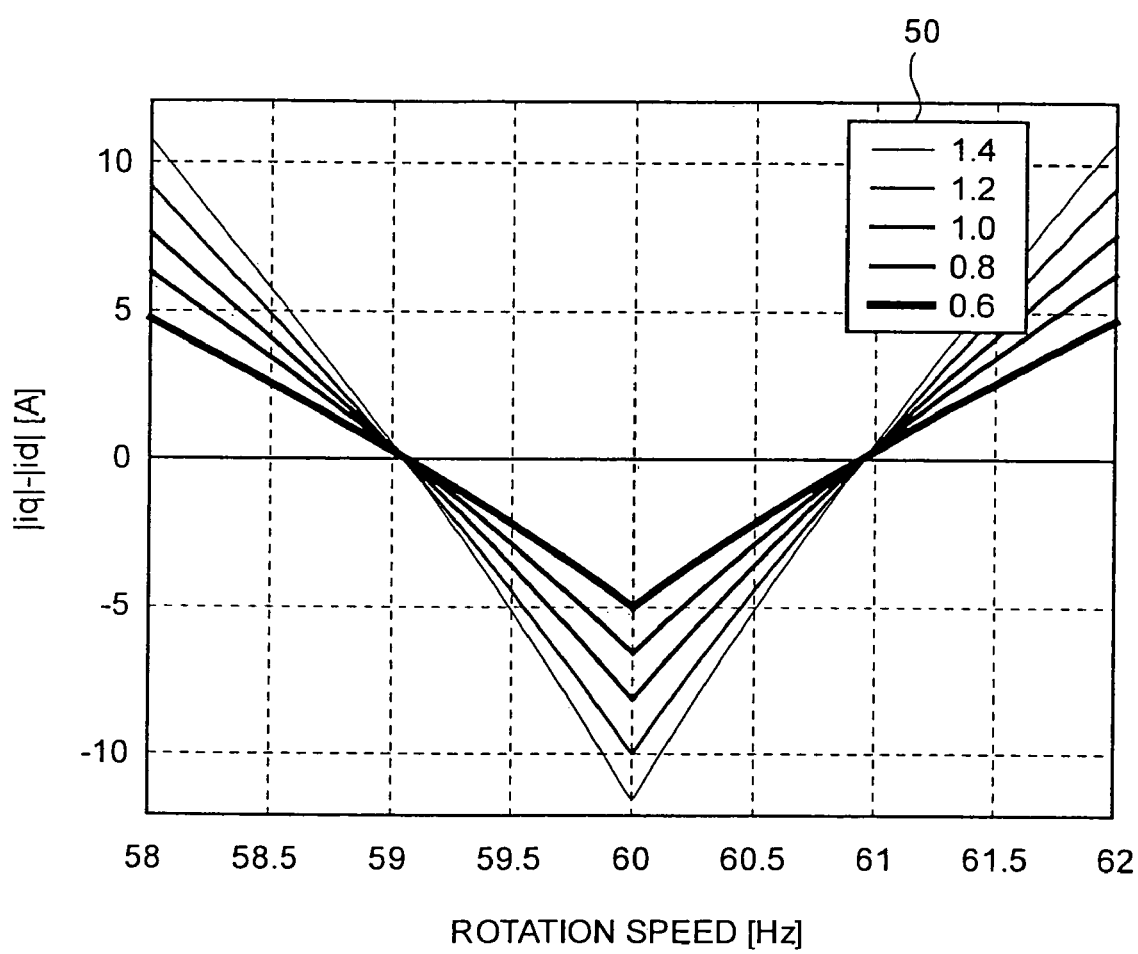
FIG. 5 is a graph explaining the relationship between rotation speed and current deviation ($|iq|-|id|$) when the excitation current command is variably changed at the primary frequency of 60 Hertz.
Figure 6:
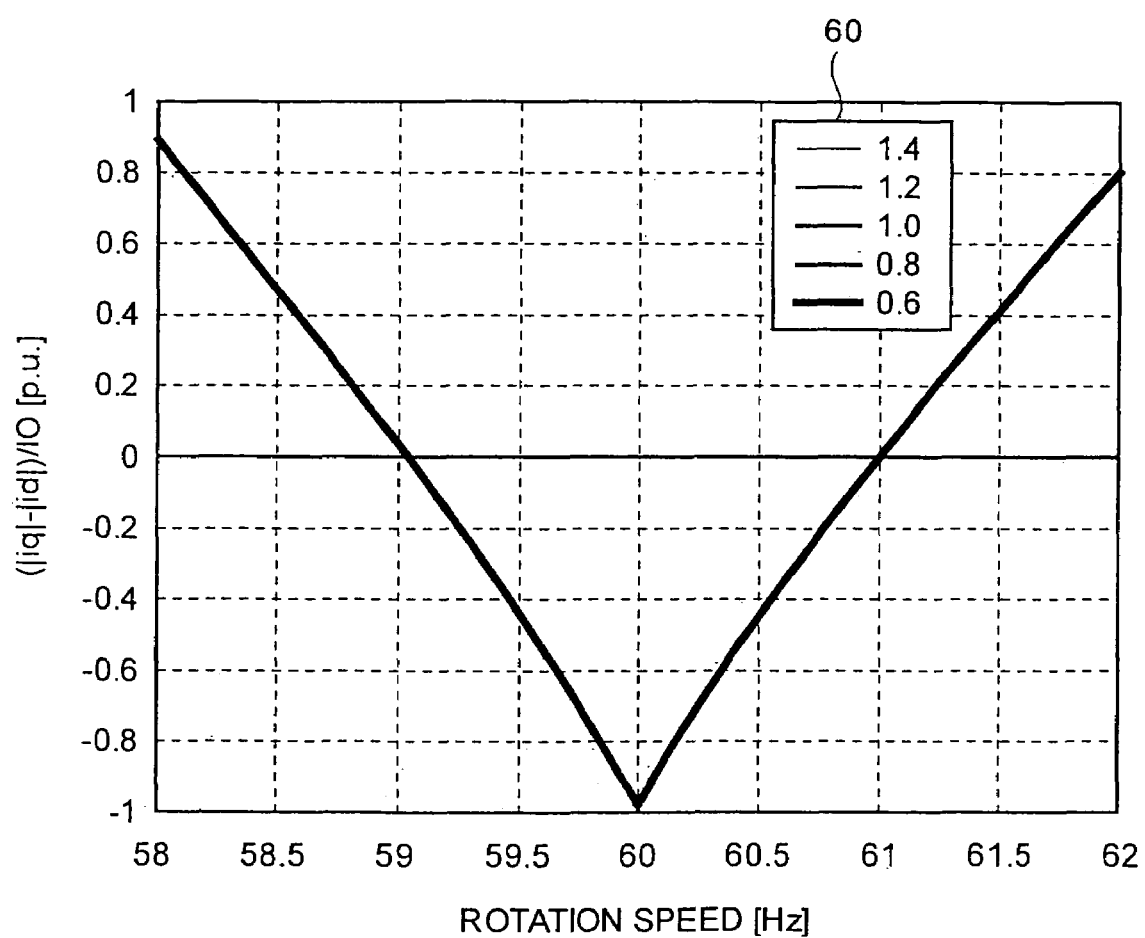
FIG. 6 is a graph for explaining the relationship between rotation speed and current deviation ($|iq|-|id|$)/(excitation current command) when the excitation current command is variably changed at the primary frequency of 60 Hertz.
Figure 7:
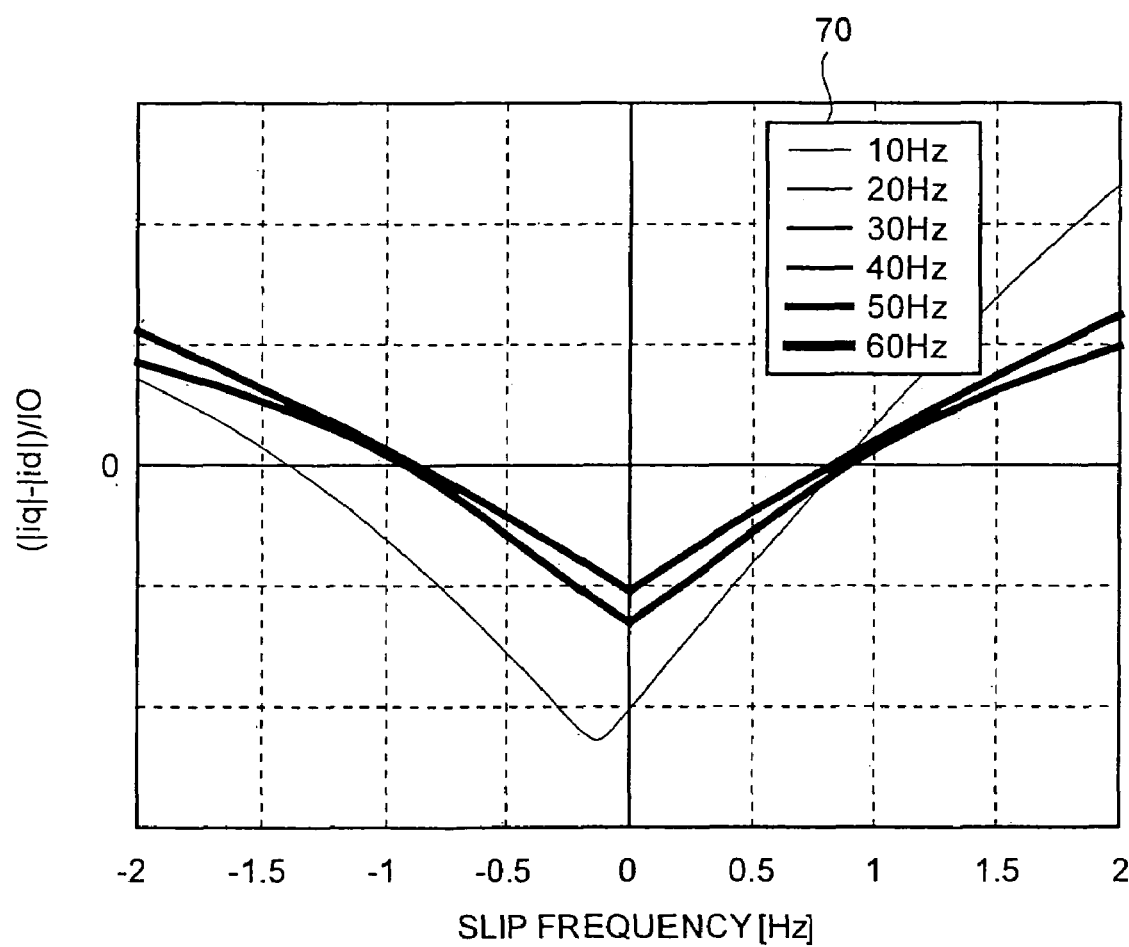
FIG. 7 is a graph explaining the relationship between slip frequency and current deviation ($|iq|-|id|$)/(excitation current command) when the rotation speed is variably changed at the primary frequency of 60 Hertz.

With reference to FIGS. 4 to 7, an operation performed by the control apparatus that includes the voltage command computing unit 12 constituted as explained above will next be explained. FIG. 4 is a characteristic chart for explaining the technique disclosed in the Patent Literature 1, and FIGS. 5 to 7 are characteristic charts obtained in this embodiment. In the drawings, stationary characteristics when the rotating machine 1 is driven in an open loop at vd*=0, vq*=ωLsI0, and K1=1 are shown for facilitating understanding.

As explained above, the voltage command computing unit 12 according to this embodiment does not calculate the square of the q-axis current component iq and that of the d-axis current component id on the rotation two-axis coordinate. However, if the voltage command computing unit 12 calculates the squares to follow the technique disclosed in the Patent Literature 1, the relationship between the rotation speed and the current deviation (iq²−id²) is as shown in FIG. 4.

In FIG. 4, a horizontal axis represents the rotation speed [Hz] and is graduated from 58 to 62 hertz. A vertical axis represents the current deviation (iq²−id²) [A²] and is graduated from 400 to −200 hertz. The primary frequency is 60 hertz. The excitation current command I0 is changed between 0.6 time and 1.4 times greater than a reference value 200 [V]/(2π60Ls) [A] (see reference symbol 40).

As shown in FIG. 4, when the rotation speed is near 59 hertz or 61 hertz, the current deviation (iq²−id²) is zero irrespective of the excitation current command I0.

This is considered that, with the technique disclosed in the Patent Literature 1 for setting the amplitude ratio of the square of the d-axis current component id to the square of the q-axis current component iq on the rotation two-axis coordinate to be equal to the preset predetermined value, the excitation current command I0 is operated so that an actual rotation speed is near 59 or 61 hertz, thereby adjusting a generated torque.

However, as can be understood from FIG. 4, when the rotating machine 1 is controlled based on a magnitude of the current deviation (iq²−id²), the relationship between the magnitude of the current deviation (iq²−id²) and the rotation speed (or slip frequency) has a nonlinear change. Therefore, a convergence response when an initial rotation speed is 60 hertz and the rotation speed converges to 59 hertz does not coincide with a convergence response when the initial rotation speed is 58 hertz and the rotation speed converges to 59 hertz.

FIG. 5 depicts a relationship between the rotation speed and the current deviation (|iqs|−|ids|) obtained by the voltage command computing unit 12 according to this embodiment. In FIG. 5, a horizontal axis represents the rotation speed [Hz] and is graduated from 58 to 62 hertz. A vertical axis represents the current deviation (|iqs|−|ids|) [A] and is graduated from 10 to −10. The primary frequency is 60 hertz. Further, the excitation current command I0 is changed between 0.6 time and 1.4 times greater than the reference value 200[V]/(2π60Ls)[A] (see reference symbol 50).

In FIG. 5, similarly to FIG. 4, when the rotation speed is near 59 hertz or 61 hertz, the current deviation (iqs−ids) is zero irrespective of the excitation current command I0.

In FIG. 5, differently from FIG. 4, however, when the rotation speed is near 59 or 61 hertz, the current deviation (|iqs|−|ids|) has a proportional change to a change in the rotation speed.

Namely, an instance of K1=1 will be considered. The minor excitation current computing unit 20 shown in FIG. 3 includes the absolute value computing unit 30 that computes the absolute value |id| of the d-axis current component id, the absolute value computing unit 31 that computes the absolute value |iq| of the q-axis current component iq, and the subtracter 33 that computes the current deviation (|iq|−|id|). Therefore, the convergence response when the initial rotation speed is 60 hertz and the rotation speed converges to 59 hertz coincides with that when the initial rotation speed is 58 hertz and the rotation speed converges to 59 hertz.

According to the characteristics shown in FIGS. 4 and 5, the amplitude of the current deviation differs according to the excitation current command I0 even at an equal rotation speed. This is why the current transient response when the load torque increases differs from that when the load torque decreases even if the load torque is at an equal operating point, and the current transient response when the operating point of the load torque is at a light load point differs from that when the operating point of the load torque is at a heavy load point according to the technique disclosed in the Patent Literature 1.

According to this embodiment, when the rotating machine 1 is controlled based on the current deviation (|iq|−|id|), the problem that the response before the rotation speed converges to the stationary point does not coincide may occur, depending on the initial value of the excitation current command I0, as shown in FIG. 5. However, as can be understood from the configuration shown in FIG. 3, an operation for obtaining the characteristic shown in FIG. 6 from that shown in FIG. 5 is performed in this embodiment, therefore, such a problem does not occur in this embodiment.

FIG. 6 depicts a relationship between the rotation speed and the current deviation (|iqs|−|ids|)/(excitation current command) when the excitation current command is variably changed at the primary frequency of 60 hertz.

In FIG. 6, a horizontal axis represents the rotation speed [Hz] and is graduated from 58 to 62 hertz. A vertical axis represents the current deviation (|iqs|−|ids|)/(excitation current command I0 [p.u]) and is graduated from +1 to −1. In FIG. 6, the excitation current command I0 is changed between 0.6 time and 1.4 times greater than the reference value 200 [V]/(2π60Ls) [A] (see reference symbol 60).

As shown in FIG. 6, if the current deviation to be controlled is (|iqs|−|ids|)/I0, the relationship between the rotation speed and the current deviation to be controlled does not depend on the amplitude of the excitation current command I0. An operation of this current deviation (|iqs|−|ids|)/(excitation current command I0) is performed by the divider 34 shown in FIG. 3.

As can be seen, according to this embodiment, the absolute value of the q-axis current component and that of the d-axis current component can be divided by the excitation current command I0 that is changed according to the load. Therefore, even if the operating point of the load torque changes from the light load point to the heavy load point, the current transient response can be kept constant.

FIG. 7 depicts a relationship between the slip frequency and the current deviation {(|iqs|−|ids|)/(excitation current command)} when the rotation speed is changed at the primary frequency of 60 hertz. In FIG. 7, a horizontal axis represents the slip frequency [Hz], and a vertical axis represents the current deviation {(|iqs|−|ids|)/(excitation current command I0)}. In FIG. 7, the rotation speed is changed from 10 to 60 hertz (see reference symbol 70), and the excitation current command I0 is set at the reference value (200V/(2π60Ls)).

In FIG. 7, the slip frequency at a point at which the current deviation {(|iqs|−|ids|)/(excitation current command I0)} is zero when the rotation speed is as low as about 10 hertz slightly differs from the slip frequency when the rotation speed is equal to or higher than 20 hertz. However, as shown in FIG. 7, at the rotation speed of 20 hertz or higher, the slip frequency is hardly influenced by the rotation speed. Namely, even if the rotation speed is rapidly changed by the impact load or the like, the slip frequency can be kept constant.

As explained above, according to this embodiment, the absolute values of the current components are computed so that they are equal to the preset predetermined value, instead of computing the power component in phase with the primary voltage component command and the second power component shifted in phase by 90 degrees from the primary voltage component command. Therefore, as long as the load torque is at the equal operating point, the current transient response when the load torque increases can be made coincident with that when the load torque decreases.

The absolute value of each current component is divided by the excitation current command that is changed according to the load. Therefore, the current transient response when the operating point of the load torque is at the light load point can be made coincident with that when the operating point of the load torque is at the heavy load point.

Since the frequency corrector corrects the primary angular frequency, the rapid change in the current amplitude according to the rapid change in the rotation speed due to the impact load or the like can be suppressed. Therefore, the problem that the overcurrent may possibly occur can be solved.

In the present embodiment, the induction machine is taken as an example of the rotating machine, but it is not particularly limited thereto, and other machines such as a synchronous machine can be applied similarly.

INDUSTRIAL APPLICABILITY

The present invention can keep the current transient response constant irrespective of the change in the load torque or the operating point, and set the current amplitude within a desired range even when the rotation speed is rapidly changed by the impact load or the like. The present invention is, therefore, suited as a control apparatus that highly efficiently controls driving of a rotating machine such as a three-phase induction motor or a synchronous motor.

The invention claimed is:

1. A control apparatus for a rotating machine, comprising:
an integration unit that integrates a primary angular frequency based on an angular velocity command and computes phase;
a power converting unit that applies a three-phase voltage to the rotating machine in accordance with a three-phase voltage command;
a current detecting unit that detects a three-phase current flowing through the rotating machine;
a coordinate converting unit that converts coordinates of the three-phase current detected by the current detecting unit into current components on rotating two-axis coordinates based on the phase computed by the integration unit, and that converts a voltage command on the rotating two-axis coordinates into the three-phase voltage command; and
a voltage command computing unit that computes the voltage command on the rotating two-axis coordinates, based on the primary angular frequency and deviations in absolute values of the current components along each axis of the rotating two-axis coordinates.

2. The control apparatus according to claim 1, wherein the voltage command computing unit computes an excitation current command that is changed depending on load, produces a minor excitation current command by dividing the absolute values of the current components by the excitation current command, and computes the voltage commands based on the minor excitation current command and the primary angular frequency.

3. The control apparatus according to claim 1, further comprising a frequency correcting unit that computes a frequency correction based on the current components on the rotating two-axis coordinates, and that subtracts the frequency correction from the primary angular frequency, and that outputs a corrected primary angular frequency from which the frequency correction has been subtracted.

* * * * *